O. A. SIMPSON.
PROCESS OF MANUFACTURING TUNGSTEN ANTICATHODES FOR RÖNTGEN TUBES.
APPLICATION FILED FEB. 4, 1913.

1,167,532. Patented Jan. 11, 1916.

UNITED STATES PATENT OFFICE.

OTTO ARCHIBALD SIMPSON, OF CHARLOTTENBURG, GERMANY, ASSIGNOR TO SIEMENS & HALSKE A. G., OF BERLIN, GERMANY, A CORPORATION OF GERMANY.

PROCESS OF MANUFACTURING TUNGSTEN ANTICATHODES FOR RÖNTGEN TUBES.

1,167,532.     Specification of Letters Patent.     Patented Jan. 11, 1916.

Application filed February 4, 1913. Serial No. 746,241.

*To all whom it may concern:*

Be it known that I, OTTO ARCHIBALD SIMPSON, a citizen of the German Empire, and residing at Charlottenburg, near Berlin, Germany, have invented a certain new and useful Improved Process of Manufacturing Tungsten Anticathodes for Röntgen Tubes, of which the following is a specification.

My invention relates to the manufacture of anti-cathodes for Röntgen tubes.

As is well-known, in Röntgen tubes it is desirable to form the anti-cathode mirror with a convex face in order to keep down as much as possible the production of secondary cathode rays. The manufacture of a convex mirror when tungsten is used as the anti-cathode material involves considerable difficulties, however, as soon as an attempt is made to obtain the convex face by mechanical treatment.

A primary object of my invention is to obviate the difficulties met with when making convex anti-cathodes of tungsten, and to this end I melt in the electric arc a piece of tungsten, which may be either drawn tungsten or be formed by compressing together powdered tungsten and which corresponds to the anti-cathode to be obtained, and after melting the said piece I leave it to freely cool. In consequence of the great surface tension a body having a convex surface is obtained by this melting process, and a plano-convex or a biconvex piece of tungsten can be obtained according to the form of the support or foundation on which it rests.

Figure 1:
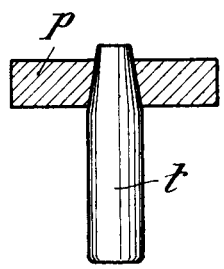
Figure 2:
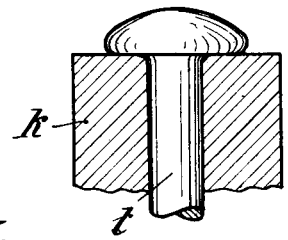
Figure 3:
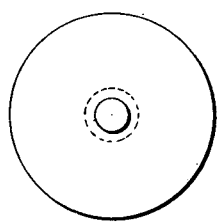

In the drawings which show the preferred embodiment of the invention, Figure 1 is a section of the anti-cathode holder, the anti-cathode being shown in elevation supported thereby; Fig. 2 is a section of the cathode at one stage of its manufacture, the stem being shown in elevation prior to its fusion with the plate; Fig. 3 is a top plan view of the same.

In its preferred embodiment, the invention contemplates the rapid conduction of heat from the anti-cathode by providing it with a stem integral therewith, said stem being adapted to mount the anti-cathode in the manner to be referred to. Preferably the following process is employed: A round plate made of tungsten metal powder under high pressure is provided with a hole and after this plate is thoroughly fused in the electric arc, a round tungsten rod is fitted into the hole in such manner that its end protrudes slightly beyond the plate. Thereupon the plate is fused in the electric arc with the upper portion of the rod. When during this process the heating is extended over the whole plate and it is permitted afterward to chill off in the open, a body is formed having a convex surface owing to the large surface tension, such as is for instance known in the manufacturing of bodies of silver. By this process not only the anti-cathode plate is joined perfectly with the stem, but also a curved surface is obtained without any additional working, which has excellent qualities with regard to its density and smoothness.

As may be seen from Fig. 1, the cathode which is inserted into anti-cathode holder $k$ (preferably a copper block) consists of a head plate $p$ with a curved surface onto which a stem $t$ is joined in such manner that the anti-cathode assumes a mushroom shape.

While the stem $t$ secures a good dissipation of the heat into the copper block $k$ this effect may be obtained in somewhat less perfect manner, when the anti-cathode is freely mounted in the Röntgen tube; in which case, however, it is advisable to employ a stem with somewhat larger cross section.

In manufacturing, the anti-cathode is made of tungsten metal powder compressed under high pressure into a round plate $p$ and as may be seen from Figs. 2 and 3 it is provided with a hole or an opening. After the plate has been thoroughly fused in the electric arc a rod $t$ of tungsten metal, preferably somewhat pointed at its end, is inserted into this hole so that it slightly protrudes beyond the surface of plate $p$. Then the plate and the stem are fused together in the electric arc and permitted to chill in the open, so that the form is obtained which is shown in Fig. 1.

I claim:—

1. A process of making tungsten anticathodes for Röntgen tubes, consisting in melting an annular piece of tungsten formed of powdered tungsten compressed together and fitted on the end of a drawn rod of tungsten and continuing the process until the said piece and rod become welded together, and in allowing the molten mass so formed to cool freely.

2. A process of making tungsten anticathodes for Röntgen tubes, consisting in melting a hole into a plate of tungsten formed of tungsten powder compressed together, in fitting in the hole the tapered end of a drawn rod of tungsten, in heating said plate until the plate is melted and welded to the rod, and in allowing the molten mass so formed to cool freely.

3. The process of manufacturing an anticathode for Röntgen tubes which consists in compressing tungsten metal powder to form a plate, in providing said plate with a hole, in inserting a stem into said hole, and in fusing said stem to said plate.

4. The process of manufacturing an anticathode for Röntgen tubes which consists in compressing tungsten metal powder and fusing the same to form an integral plate, in providing a hole in said plate, in inserting a tungsten rod into said hole with its end protruding beyond the surface of said plate, in fusing the rod and plate together, and in permitting the fused mass composed of the plate and rod end to become chilled while its surface is curved under the surface tension of the metal.

In testimony whereof I have signed my name to this specification in the presence of two witnesses.

OTTO ARCHIBALD SIMPSON.

Witnesses:
  WOLDEMAR HAUPT,
  HENRY HÄSPER.